US012786606B2

(12) United States Patent
Dyer

(10) Patent No.: US 12,786,606 B2
(45) Date of Patent: Nov. 3, 2026

(54) AMPLIFIER STAND AND METHOD OF USE THEREOF

(71) Applicant: Anthony Dyer, Saginaw, MI (US)

(72) Inventor: Anthony Dyer, Saginaw, MI (US)

( * ) Notice: Subject to any disclaimer, the term of this patent is extended or adjusted under 35 U.S.C. 154(b) by 0 days.

(21) Appl. No.: 18/830,708

(22) Filed: Sep. 11, 2024

(65) Prior Publication Data

US 2025/0267384 A1 Aug. 21, 2025

Related U.S. Application Data

(60) Provisional application No. 63/554,710, filed on Feb. 16, 2024.

(51) Int. Cl.
*H04R 1/02* (2006.01)
*F16M 11/20* (2006.01)
(Continued)

(52) U.S. Cl.
CPC ......... *H04R 1/026* (2013.01); *F16M 11/2092* (2013.01); *F16M 11/26* (2013.01); *F16M 11/38* (2013.01)

(58) Field of Classification Search
CPC ...... A47B 19/002; H04R 1/026; F16M 11/38; F16M 11/10; F16M 11/2092; F16M 11/26; B62B 2206/02; G10G 5/00
See application file for complete search history.

(56) References Cited

U.S. PATENT DOCUMENTS 4,352,480 A * 10/1982 Gathright ................. G10G 5/00 84/327
4,753,408 A * 6/1988 Wailes ................... H04R 1/026 248/161

(Continued)

FOREIGN PATENT DOCUMENTS

DE 202009000319 6/2009
WO 2014/043317 3/2014

OTHER PUBLICATIONS

Kikibro Expandable Cabinet Shelf Organizer, www.amazon.com/Expandable-stack-up-Organizer-Cupboard-Accessories/dp/B09GJQGWH8/ref=cm_cr_arp_d_product_top?ie=UTF8&th=1, accessed Aug. 28, 2024.

(Continued)

*Primary Examiner* — Patrick D Hawn

(74) *Attorney, Agent, or Firm* — Poznak Dyer Kanar Schefsky Thompson PLC; Robert C. Corbett

(57) ABSTRACT

An amplifier support stand includes two tiers of supports such that the stand is capable of supporting two amplifiers above the ground and on a level surface, which results in efficient use of stage space and enhanced sound quality from the amplifiers. The amplifier support stand includes two base members, two amplifier support members, and a frame interconnecting the base members and the support members. The base members support the stand on the ground and function as a first tier of supports for a first amplifier. The amplifier support members function as a second tier of supports for a second amplifier directly above the first amplifier. The frame enables relative movement between the amplifier support members and the base members to accommodate amplifiers of various sizes. The base members and support members are rotatable to minimize the stand's dimensions for compact storage. A corresponding method of use is also provided.

9 Claims, 6 Drawing Sheets

(51) Int. Cl.
*F16M 11/26* (2006.01)
*F16M 11/38* (2006.01)

(56) References Cited

U.S. PATENT DOCUMENTS 4,948,076 A * 8/1990 Sumrell ................. F16M 11/24 248/176.1
5,024,407 A 6/1991 Bartley
5,190,254 A * 3/1993 Maguire .............. F16M 11/245 248/164
5,298,693 A * 3/1994 Heijn ..................... A47B 81/06 181/207
5,313,866 A * 5/1994 Smith ...................... G10G 5/00 84/327
5,564,661 A * 10/1996 Gershon .............. A47B 19/002 248/167
5,975,826 A * 11/1999 Scholder ................. B66C 23/48 414/490
6,076,787 A * 6/2000 Troyer ................... F16M 13/00 248/460
6,326,531 B1 * 12/2001 Bremner .................. G10G 5/00 84/421
6,443,321 B1 * 9/2002 Felsenthal .......... A47G 25/0664 211/195
6,966,574 B1 * 11/2005 Dahl ......................... B62B 1/12 280/651
7,131,615 B1 11/2006 Bruce
7,176,366 B1 2/2007 Bruce
7,296,653 B1 * 11/2007 Smith, Jr. .............. H04R 1/026 248/370
7,490,847 B2 2/2009 Dahl
7,514,619 B1 * 4/2009 Bruce .................... A47B 81/00 248/463
7,717,377 B1 * 5/2010 Corrado ................... G10G 5/00 248/150
8,701,900 B2 * 4/2014 Childers .................. G10G 5/00 211/195
8,708,167 B2 * 4/2014 Mone ....................... G10G 5/00 211/85.6
8,733,841 B2 * 5/2014 Morris ................... A01D 34/82 297/411.36
9,644,785 B2 * 5/2017 Carpenter ............. F16M 11/24
9,741,325 B2 * 8/2017 Chen ...................... F16M 11/38
9,984,667 B2 * 5/2018 Walker ................... F16M 13/02
10,037,749 B2 * 7/2018 Glasser .................. G10G 5/005
10,299,619 B1 * 5/2019 Bennett .................... A47H 1/02
10,679,594 B2 * 6/2020 Schmidt ................ A47F 5/0037
10,894,702 B2 * 1/2021 Chamoun ............... B60S 13/00
10,900,606 B2 * 1/2021 Gaines ..................... G10G 5/00
11,490,731 B2 * 11/2022 Norman ................. F16M 11/10
11,937,691 B2 * 3/2024 Bailey .................... A47B 57/10
12,012,317 B2 * 6/2024 Dykstra .................... B66F 1/02
12,054,187 B2 * 8/2024 Hanna ................... B62B 5/0083
12,080,260 B2 * 9/2024 Henkel .................. F16M 11/10
2003/0062663 A1 * 4/2003 Fox ...................... B25H 1/0007 269/17
2010/0294900 A1 * 11/2010 Maurer ..................... A45F 3/44 248/419
2011/0147547 A1 * 6/2011 Fitzpatrick ............. F16M 13/00 248/157
2014/0072160 A1 * 3/2014 Peacock ................. F16M 11/10 248/123.11
2014/0159346 A1 * 6/2014 Laffan ..................... B62B 7/008 280/650
2014/0346756 A1 * 11/2014 Laffan ....................... B62B 7/10 280/648
2015/0330558 A1 * 11/2015 Intravatola ............. F16M 11/28 362/184
2025/0022445 A1 * 1/2025 Wilson ..................... G10G 5/00
2025/0095616 A1 * 3/2025 Wang ..................... G10D 13/26

OTHER PUBLICATIONS

AS Amplifier/Monitor Stand, https://www.stagelinestands.com/product/as5-amplifier-monitor-stand/, accessed Aug. 28, 2024.

* cited by examiner

AMPLIFIER STAND AND METHOD OF USE THEREOF

CROSS REFERENCE TO RELATED APPLICATION

This application claims the benefit of U.S. Provisional Patent Application No. 63/554,710, filed Feb. 16, 2024, and which is hereby incorporated by reference in its entirety.

TECHNICAL FIELD

This disclosure relates to stands for supporting sound amplifiers.

BACKGROUND

The majority of professional musicians perform at clubs, bars, parties, weddings, etc. and must supply their own equipment. One of the most important pieces of equipment is an amplifier because the amplifier enables the audience to hear the musician's instrument. As used herein, an "amplifier" is the combination of an amplifier head, which amplifies the electrical signals produced by a musical instrument, and a speaker that receives the amplified electrical signals. As understood by those skilled in the art, an "amplifier" includes what is referred to as a "combo amp," i.e., an apparatus in which the amplifier head and speaker are integrated in a single housing. An "amplifier" also includes amplifier heads and speakers operatively interconnected with each other but housed in separate housings, which is commonly referred to as a "head and cab" or "head and cabinet."

If an amplifier malfunctions or ceases to function during a musical performance, the performance is essentially terminated. This can be especially problematic at an event like a wedding reception where, instead of an evening of dancing and celebration, there is now quiet solemnity. Even at a night club or party, the failure of an amplifier will result in disappointed ticket holders or other attendees.

To avoid the disastrous consequences of an amplifier failure, musicians may bring two amplifiers to a performance so that there is a back-up amplifier in the event that one fails to function properly. However, having two amplifiers takes up limited space on the stage or other performance space, which limits freedom of movement of the musician and may alter the aesthetic by making the performance space appear cluttered.

Furthermore, for amplifiers emitting middle and high frequency sounds, the sound is directional. When an amplifier is placed on the ground or the stage, the sound waves are emitted from the amplifier at a height that is too low for the musician to hear, i.e., the sound waves travel past the musician's legs instead of the musician's ears. Accordingly, the musician may not receive the feedback necessary for optimal musicianship during the performance.

Some musicians employ an amplifier stand that tilts the amplifier so that the sound waves are directed at approximately forty-five degrees relative to the ground and thus directed at the ears of the musician. However, this arrangement results in two significant problems. The first problem is that the sound waves do not travel directly toward the audience thus depriving the audience of the full benefit of the amplifier and the music. The second problem is that, to compensate for the first problem, the amplifier must be quite loud, which, combined with the proximity to the musicians ears, may result in hearing loss over time.

Semi-professional musicians have struggled with these problems for decades without a solution.

SUMMARY

According to one aspect of the present disclosure, an amplifier stand is provided that includes a frame, first and second support members, and first and second base members. The base members support a first amplifier, and the support members support a second amplifier directly above the first amplifier. Thus the amplifier stand enables a musician to have two amplifiers using the same floor space as a single amplifier, and elevates both amplifiers for enhanced sound dispersion. The stand provides adequate space between the bottom amp and the top amp so that controls on bottom amp are accessible. The amplifier stand supports the amplifiers horizontally, so that the sound reaches both the musician and the audience.

With two amplifiers, each being positioned on the amplifier stand to provide adequate sound dispersion, a musician thus has a spare amplifier in the event that one of the amplifiers malfunctions. Furthermore, a musician may also employ both amplifiers simultaneously for a richer sound than a single amplifier would produce. Additionally, if each of the two amplifiers has different sound-reproduction characteristics, the musician could alternate which of the amplifiers is being used depending on the sound characteristics desired for a particular song.

In at least one embodiment, the frame enables the movement of the base members and amplifier support members relative to one another so that the amplifier stand can accommodate amplifiers of various sizes and shapes. Furthermore, in at least one embodiment, the base members and amplifier support members are rotatable relative to the frame so that the stand can be made compact for easy storage and transportation. The frame is coplanar for further compactness, which is an important feature for musicians that have to travel to performances.

A corresponding method of using the amplifier stand is also provided.

The above features and advantages and other features and advantages of the present disclosure are readily apparent from the following detailed description of the best modes for carrying out the disclosure when taken in connection with the accompanying drawings.

DETAILED DESCRIPTION

Figure 1:
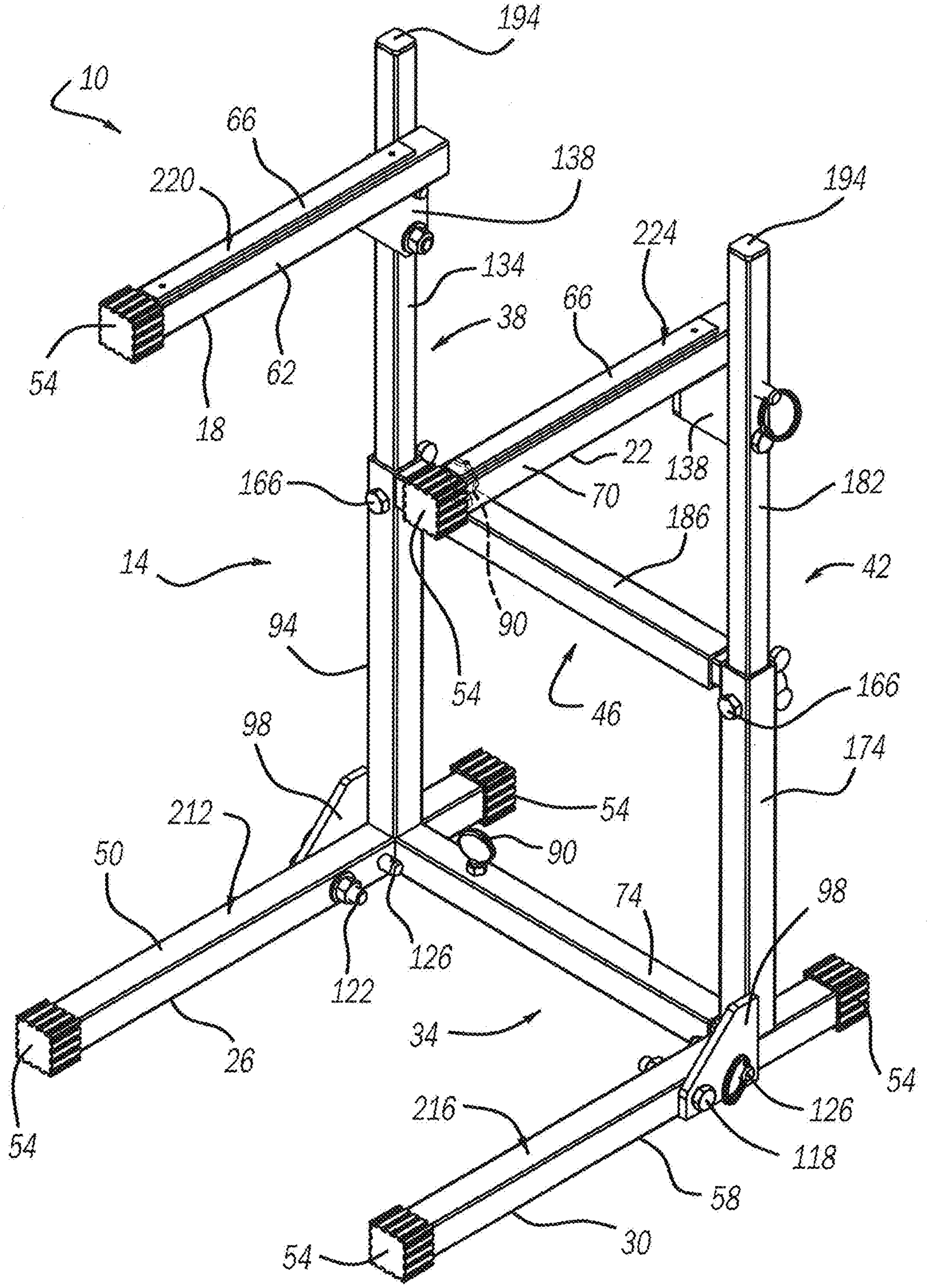
FIG. 1 is a schematic, perspective view of an amplifier stand.

Referring to the Figures, wherein like reference numbers refer to like components, an amplifier stand 10 is schematically depicted. The stand 10 includes a frame 14. A first amplifier support member 18, a second amplifier support member 22, a first base member 26, and a second base member 30 are mounted to the frame 14. When the stand 10 is in a typical use position, the base members 26, 30 contact the ground, and the amplifier support members 18, 22 are above the base members 26, 30.

In the embodiment depicted, the frame 14 includes a first telescoping tube assembly 34 that interconnects the first and second base members 26, 30. The frame 14 also includes a second telescoping tube assembly 38 that interconnects the first base member 26 and the first amplifier support member 18. The frame 14 further includes a third telescoping tube assembly 42 that interconnects the second base member 30 and the second amplifier support member 22. A fourth telescoping tube assembly 46 interconnects the second and third telescoping tube assemblies 38, 42.

Accordingly, the first and fourth telescoping tube assemblies 34, 46 of the frame 14 permit selective horizontal movement of the first and second base members 26, 30 relative to one another, and thus the horizontal distance between the first and second base members 26, 30 is selectively variable. The first and fourth telescoping tube assemblies 34, 46 also indirectly interconnect the first and second amplifier support members 18, 22, and thus the horizontal distance between the first and second amplifier support members 18, 22 is selectively variable.

Similarly, the second telescoping tube assembly 38 of the frame 14 permits selective vertical movement of the first amplifier support member 18 relative to the first base member 26, and thus the vertical distance between the first base member 26 and the first amplifier support member 18 is selectively variable.

Likewise, the third telescoping tube assembly 42 of the frame 14 permits selective vertical movement of the second amplifier support member 22 relative to the second base member 30, and thus the vertical distance between the second base member 30 and the first amplifier support member 22 is selectively variable.

In the embodiment depicted, the first base member 26 includes a hollow tube 50 having a square cross-sectional shape and two end caps 54 press-fit onto each end of the tube 50. Similarly, the second base member 30 includes a hollow tube 58 that is substantially identical to hollow tube 50. Tube 54 also has two end caps 54 press-fit onto each end.

The first amplifier support member 18 includes a hollow tube 62 having a square cross-sectional shape and an end cap 54 press-fit onto one end. The first amplifier support member 18 includes an anti-slip strip 66 mounted to the tube 62 such as by adhesive bonding. Similarly, the second amplifier support member 22 includes a hollow tube 70 that is substantially identical to tube 62, with an end cap 54 press-fit onto one end and an anti-slip strip 66 mounted to the tube 70. Anti-slip strips 66 are material having a higher coefficient of friction than the tubes 62, 70.

Telescoping tube assembly 34 includes a hollow tube 74 having a square cross-sectional shape that is mounted to the tube 58 such as by welding such that the tube 74 is perpendicular to tube 58. Tube 74 defines an enclosed space 78. Telescoping tube assembly 34 also includes a tube 82 that is mounted to tube 50 such as by welding such that the tube 82 is perpendicular to tube 50.

The outer dimensions of tube 82 are slightly smaller than the inner dimensions of tube 74. Tube 82 extends into the enclosed space 78 of tube 74 such that movement of tube 82 relative to tube 74 is substantially limited to linear translation. Tube 74 defines a hole 86 through which a thumb screw 90 extends. Thumb screw is selectively rotatable to engage tube 82 within the enclosed space 78. Thus, thumb screw 90 selectively locks tube 82 relative to tube 74.

Telescoping tube assembly 38 includes a hollow tube 94 having a square cross-sectional shape that is rotatably mounted to the tube 50 such that the tube 94 is perpendicular to tube 50 and perpendicular to tube 82. The tube 94 is mounted to tube 50 via a bracket 98. More specifically, the tube 50 defines two holes 102, 106. The bracket 98, which is welded to the tube 94, also defines two holes 110, 114. A bolt 118 extends through holes 102, 110 and is secured with a nut 122 to attach the tube 94 to tube 50, and a pin 126 extends through holes 106, 114 to prevent rotation of tube 94 relative to tube 50 about bolt 118. When the pin 126 extends through holes 106, 114, the tube 94 is perpendicular to tube 50.

Tube 94 defines an enclosed space 130. Telescoping tube assembly 38 also includes a tube 134 that is rotatable mounted to the tube 62 of the first amplifier support member 18. In the embodiment depicted, a bracket 138 is welded to the tube 62. The bracket 138 defines two holes 142, 146. Tube 134 defines two holes 150, 154. A bolt 118 extends through holes 142, 150 and is secured with a nut 122 to attach the tube 62 to tube 134, and a pin 126 extends through holes 146, 154 to prevent rotation of tube 62 relative to tube 134 about bolt 118. When the pin 126 extends through holes 146, 154, the tube 62 is perpendicular to tube 134.

The outer dimensions of tube 134 are slightly smaller than the inner dimensions of tube 94. Tube 134 extends into the enclosed space 130 of tube 94 such that movement of tube 134 relative to tube 94 is substantially limited to linear translation. Tube 94 defines a hole 158. Tube 134 defines a plurality of holes 162A, 162B, 162C, 162D. Tube 134 is selectively lockable relative to tube 94 by moving the tube 134 such that one of the holes 162A, 162B, 162C, 162D aligns with hole 158 and inserting a bolt 166 through the hole 158 and one of holes 162A-162D and securing the bolt 166 with a wing nut 170.

Telescoping tube assembly 42 includes a hollow tube 174 having a square cross-sectional shape that is rotatably mounted to the tube 58 such that the tube 174 is perpendicular to tube 58 and perpendicular to tube 74. The tube 174 is mounted to tube 58 via a bracket 98. More specifically, the tube 58 defines two holes 102, 106. The bracket 98, which is welded to the tube 174, also defines two holes 110, 114. A bolt 118 extends through holes 102, 110 and is secured with a nut 122 to attach the tube 174 to tube 58, and a pin 126 extends through holes 106, 114 to prevent rotation of tube 174 relative to tube 58 about bolt 118. When the pin 126 extends through holes 146, 154, the tube 174 is perpendicular to tube 58.

Tube 174 defines an enclosed space 178. Telescoping tube assembly 42 also includes a tube 182 that is rotatably mounted to the tube 70 of the second amplifier support member 22. In the embodiment depicted, a bracket 138 is welded to the tube 70. The bracket 138 defines two holes 142, 146. Tube 182 defines two holes 150, 154. A bolt 118 extends through holes 142, 150 and is secured with a nut 122 to attach the tube 70 to tube 182, and a pin 126 extends through holes 146, 154 to prevent rotation of tube 70 relative to tube 182 about bolt 118. When the pin 126 extends through holes 146, 154, the tube 70 is perpendicular to tube 182.

The outer dimensions of tube 182 are slightly smaller than the inner dimensions of tube 174. Tube 182 extends into the enclosed space 178 of tube 174 such that movement of tube 182 relative to tube 174 is substantially limited to linear translation. Tube 174 defines a hole 158. Tube 182 defines a plurality of holes 162A, 162B, 162C, 162D. Tube 134 is selectively lockable relative to tube 94 by moving the tube

134 such that one of the holes 162A, 162B, 162C, 162D aligns with hole 158 and inserting a bolt 166 through the hole 158 and one of holes 162A-162D and securing the bolt 166 with a wing nut 170.

In the embodiment depicted, tubes 94 and 174 are substantially identical to one another, and tubes 134 and 182 are substantially identical to one another. The telescoping tube assembly 46 includes a hollow tube 186 that is mounted to tube 174, such as by welding. Tube 186 is identical to, and parallel to, tube 74. Telescoping tube assembly 46 also includes tube 190 mounted to tube 94 such as by welding. Tube 190 is substantially identical to, and parallel to, tube 82. Tube 190 extends into tube 186 for linear translation therein. Tube 190 is selectively lockable by turning thumb screw 90 that extends into tube 186.

End caps 194 are inserted into the open ends of tubes 134, 182. In the embodiment depicted, the amplifier stand 10 does not include any parts or components that are not shown in the drawings or described herein.

Figure 2:
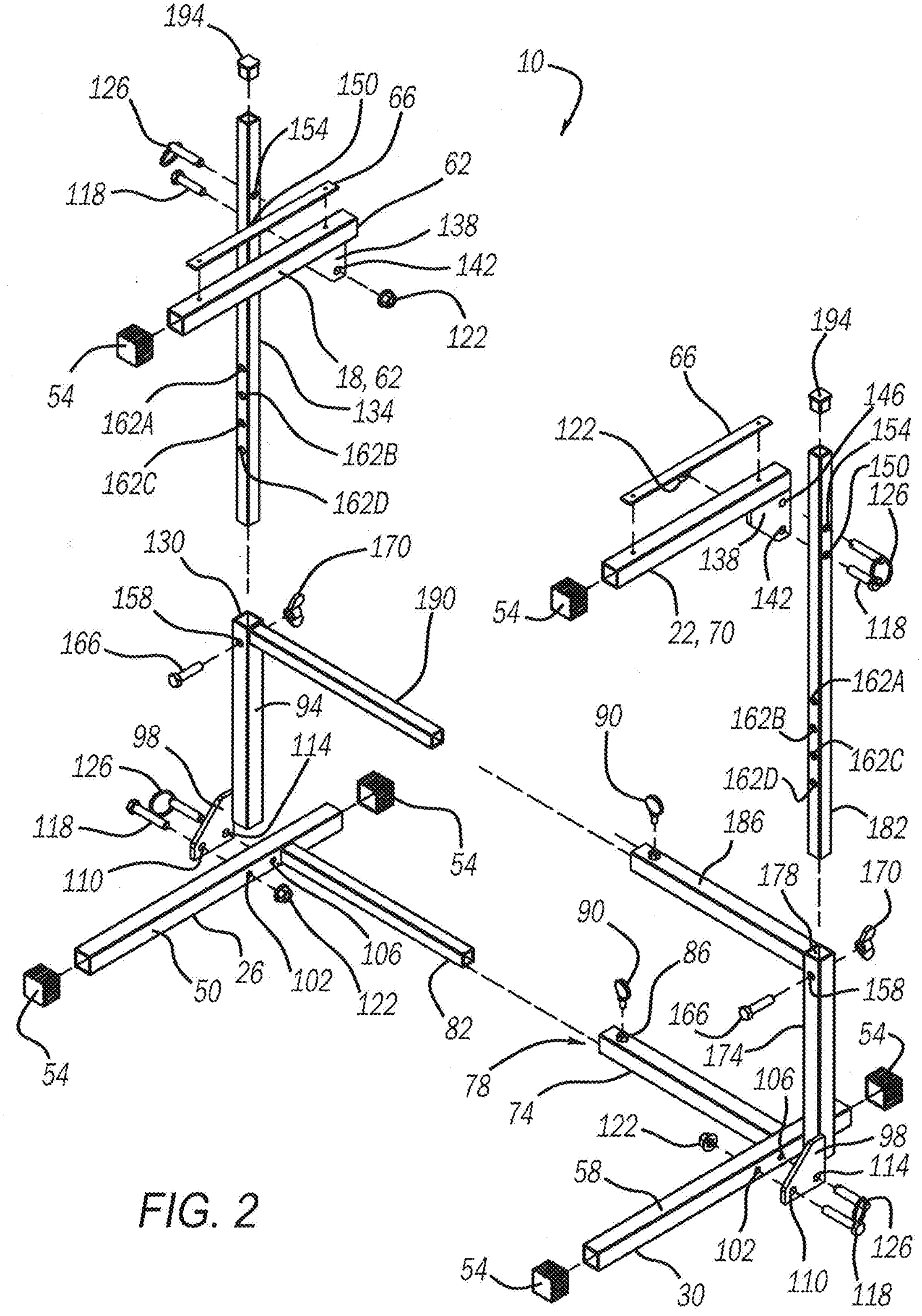
FIG. 2 is a partially exploded, perspective view of the amplifier stand.
Figure 3:
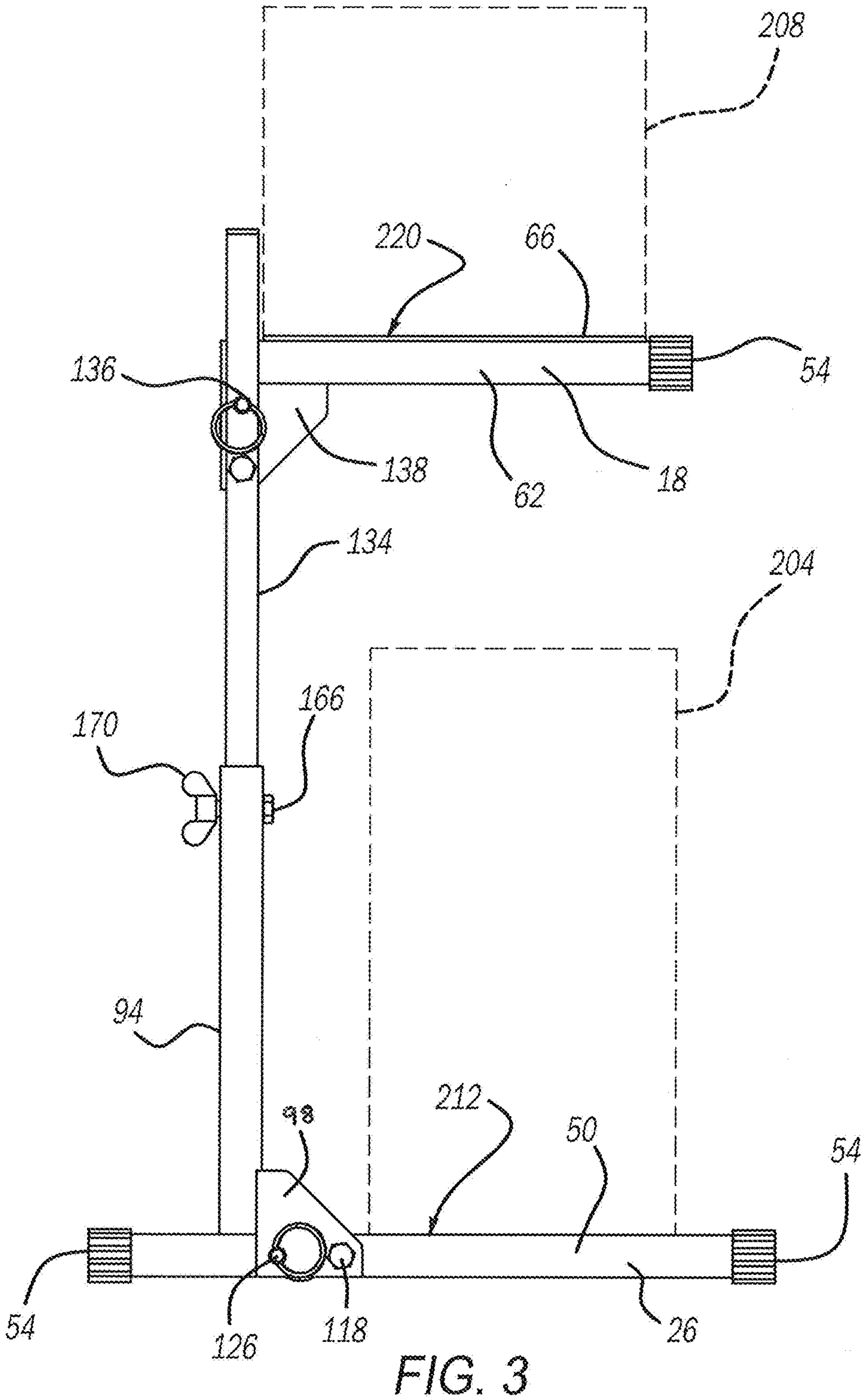
FIG. 3 is a schematic, side view of the amplifier stand.
Figure 4:
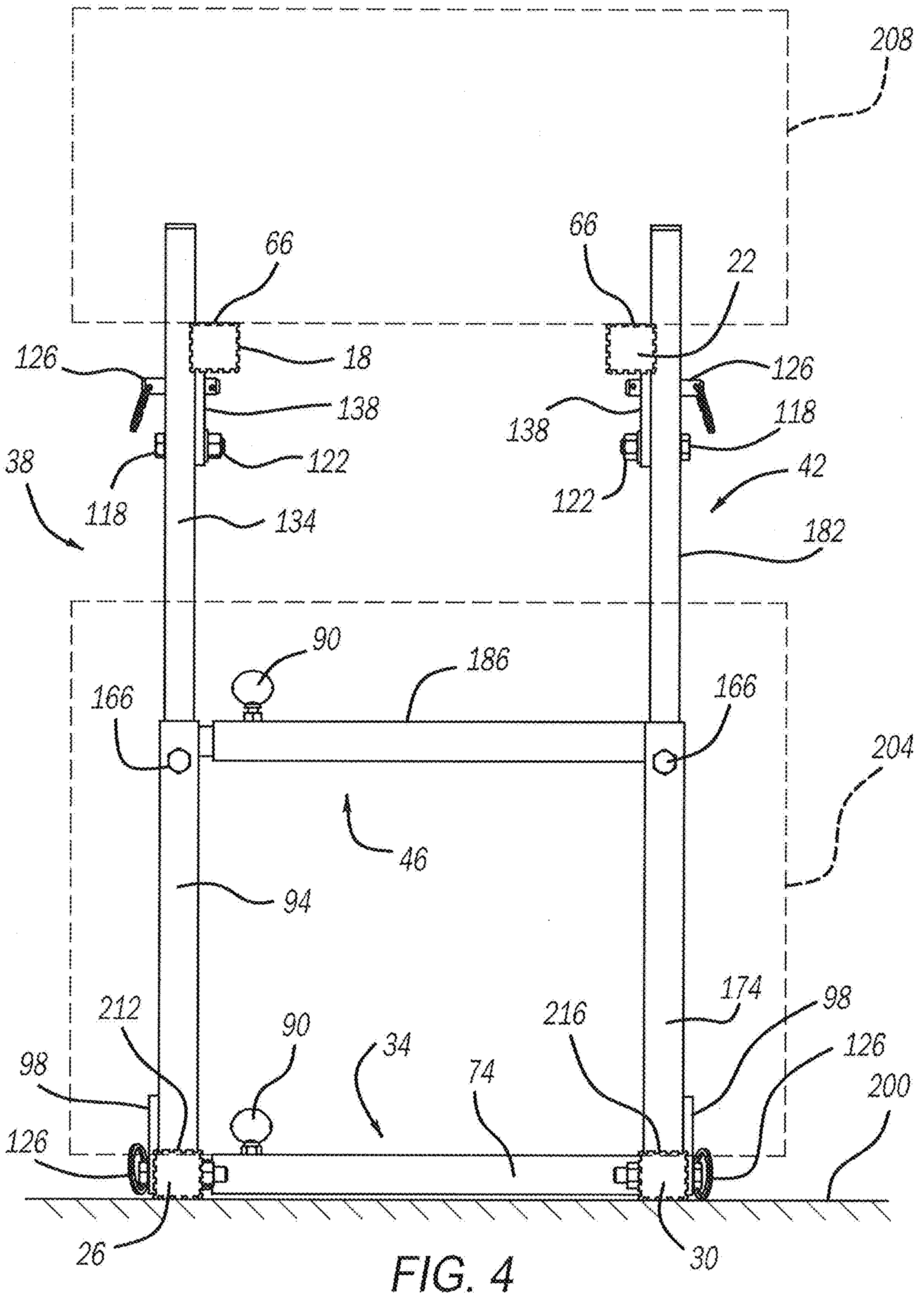
FIG. 4 is a schematic, front view of the amplifier stand.
Figure 5:
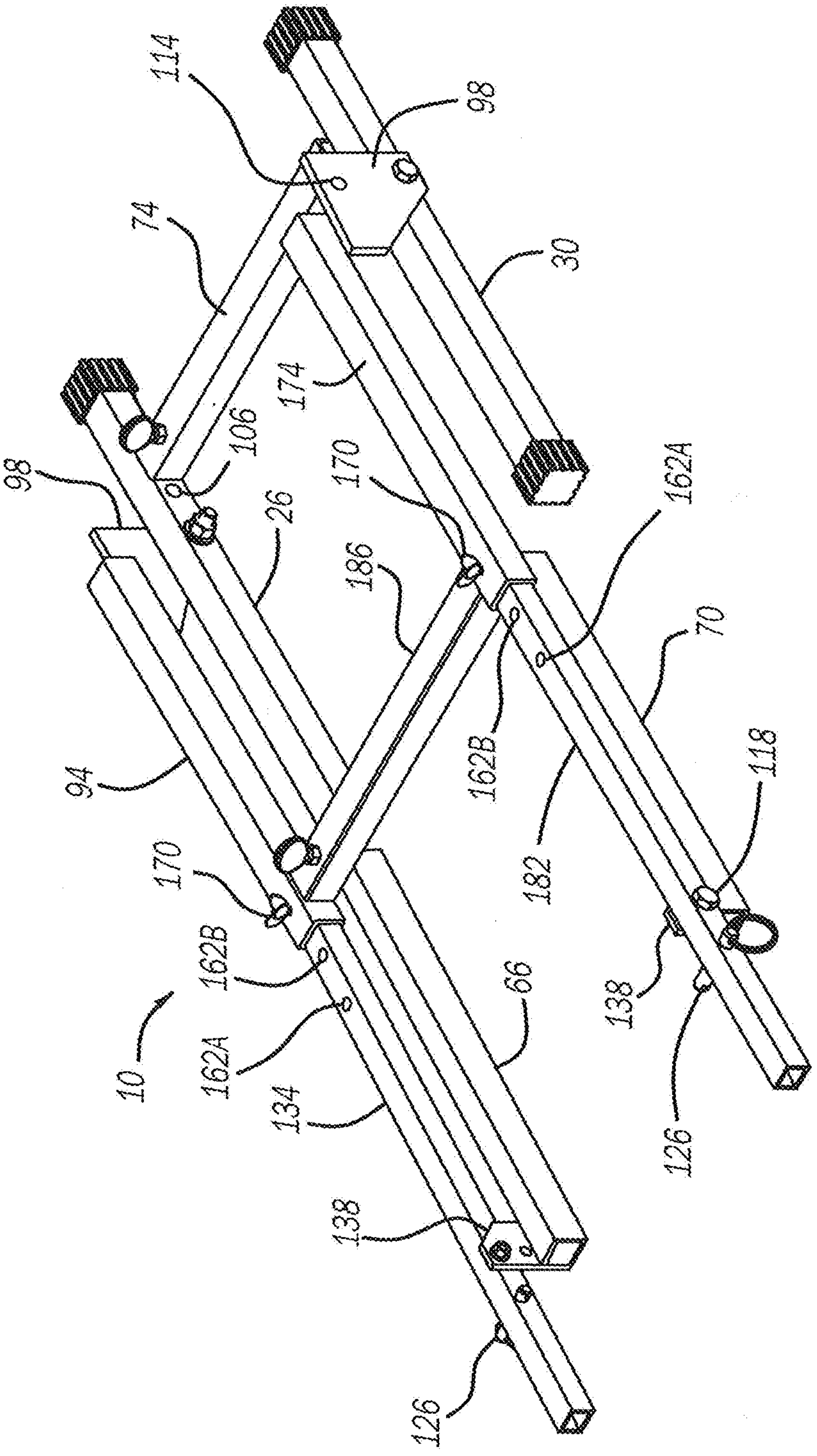
FIG. 5 is a schematic view of the amplifier stand in a collapsed configuration.

A method of using amplifier stand 10 is schematically depicted in FIGS. 3-5. Referring to FIGS. 3-5, wherein like reference numbers refer to like components from FIGS. 1 and 2, the method may include placing the first and second base members 26, 30 on the ground 200, which may be any horizontal surface such as a floor, a stage, etc. where a musician is performing. The method further includes placing a first amplifier 204 on the first and second base members 26, 30 and placing a second amplifier 208 on the first and second amplifier support members 18, 22 such that the second amplifier 208 is directly above the first amplifier 204.

The base members 26, 30 define respective upwardly-facing surfaces 212, 216 that the first amplifier 204 rests upon. Surfaces 212, 216 are coplanar in a first plane that is within twenty degrees of horizontal and, in the embodiment depicted, that is horizontal and parallel to the ground 200. Similarly, the amplifier support members 18, 22 define respective upwardly-facing surfaces 220, 224 that the second amplifier 208 rests upon. Surfaces 220, 224 are coplanar in a second plane that is within twenty degrees of horizontal and, in the embodiment depicted, is horizontal and parallel to the ground 200. Surfaces 220, 224 in the embodiment depicted are defined by the anti-slip strips 66.

Thus, both amplifiers are elevated above the ground for enhanced sound dispersion, including to the musician, and are horizontal for maximum audience reach.

Figure 6:
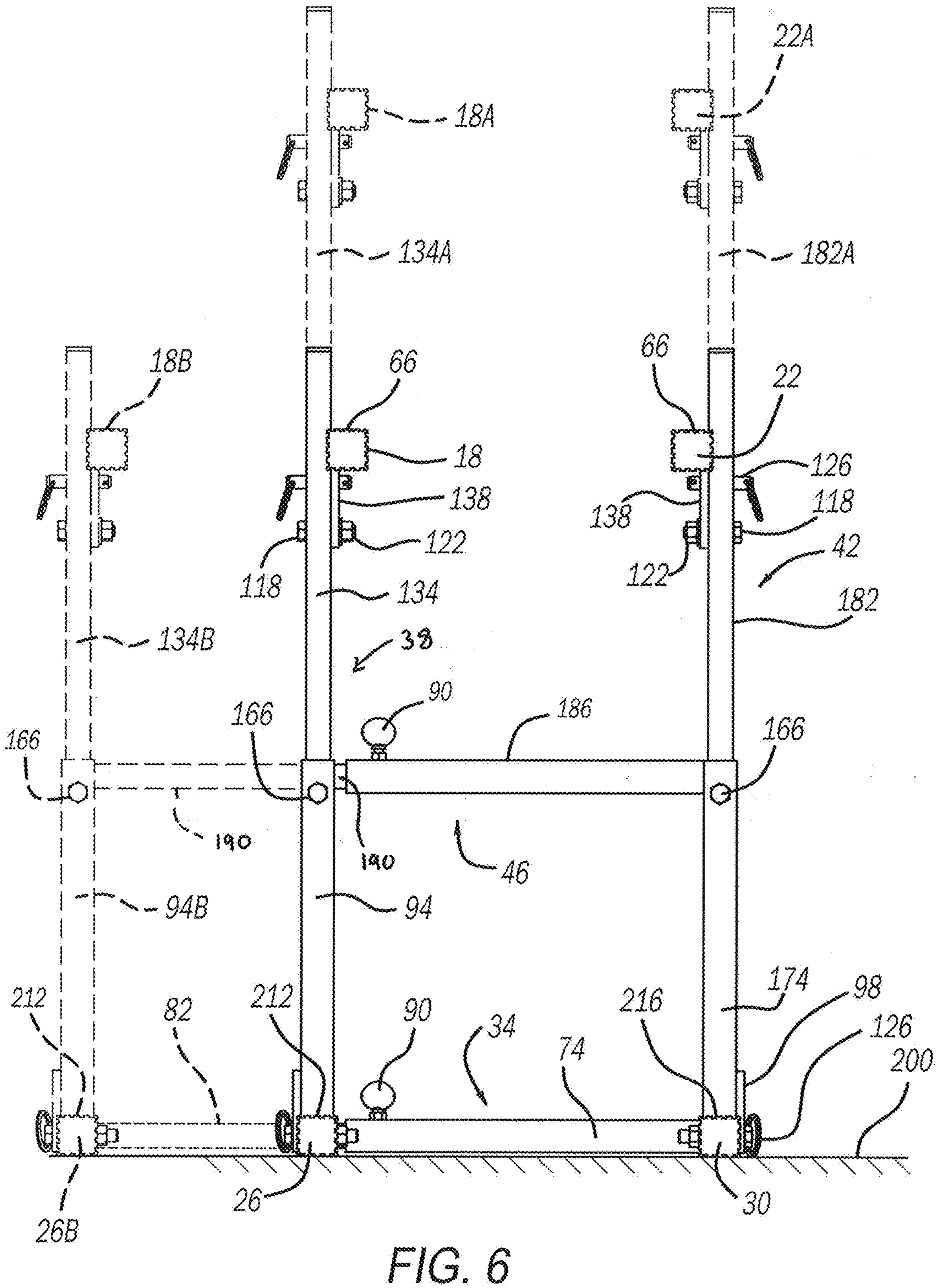
FIG. 6 is a schematic, front view of the amplifier stand with portions of the amplifier stand widened and elevated.

The method may also include adjusting the height of the amplifier support members 18, 22 by removing bolts 166 from holes 158, moving members 18, 22 to a desired height, and then reinserting bolts 166 into holes 158 and one of holes 162A-162D. FIG. 6 schematically depicts one example of adjusting the vertical distance between the amplifier support members 18, 22 and the base members 26, 30. Referring specifically to FIG. 6, removing the bolts 166 from holes 158 enables vertical movement of tube 134 relative to tube 94 from a first position shown at 134 to a second position shown in phantom at 134A. Member 18 is operatively connected to tube 134, and is thus moved from a first position shown at 18 to a second position shown in phantom at 18A. When the member 18 is in the second position, it is at a greater vertical distance from member 26 than when the member 18 is in the first position. Reinserting the bolt 166 into the hole 158 in member 94 and through the hole (162A-D) in member 134 that aligns with hole 158 will re-lock member 134 relative to member 94.

Likewise, removing the bolts 166 from holes 158 enables vertical movement of tube 182 relative to tube 174 to the position shown in phantom at 182A. Member 22 is operatively connected to tube 134, and is thus moved to the position shown in phantom at 22A. When the member is at the position shown 22A, it is at a greater vertical distance from member 30 than when the member is at the position shown at 22. Reinserting the bolt 166 into the hole 158 in member 174 and through the hole (162A-D) in member 182 that aligns with hole 158 will re-lock member 182 relative to member 174.

The method may also include adjusting the horizontal distance between members 26, 30 and members 18, 22 by loosening thumb screws 90 so that tubes 82, 190 can slide relative to tubes 74, 186 and then tightening the thumb screws 90 when the desired width of the stand 10 is achieved. For example, and with continued reference to FIG. 6, loosening the thumb screws 90 permits tubes 82 and 190 extend further out of tubes 74, 186 to the positions shown in phantom in FIG. 6, which causes tubes 94 and 134 to move the positions shown in phantom at 94B and 134B. Base member 26 is thus moved from a first position shown at 26 to a second position shown in phantom at 26B. Base member 26 is at a greater horizontal from base member 30 when the base member is in the second position shown at 26B than in the first position shown at 26.

Likewise, the movement of tube 94 to the position shown at 94B causes the amplifier support member 18 to move from a first position shown at 18 to a third position shown in phantom at 18B, which is at a greater horizontal distance than in the first position shown at 18. The adjustability of the relative positions of members 18, 22, 26, 30 enables the stand 10 to be used with amplifiers of various sizes and shapes.

Finally, the method may include removing the amplifiers 204, 208 and collapsing the stand 10 for compact transportation and storage. Collapsing the stand 10 includes removing all pins 126 and rotating tubes 58 and 62 about their respective bolts 118 so that they are parallel with tubes 94 and 134, and rotating tubes 58 and 70 about their respective bolts 118 so that they are parallel with tubes 174 and 182, as shown in FIG. 5. It should be noted that, in the embodiment depicted, each of the base members 26, 30 and each of the amplifier support members 18, 22 are connected to each other only via the frame 14, and thus each of the base members 26, 30 and each of the amplifier support members 18, 22 is rotatable independently of one another.

All tubes in the embodiment depicted are constructed of industrial metal tubing. Tubes 50, 58, 62, 70, 74, 94, 174, 186 are 1 inch by 1 inch in cross-sectional dimensions.

While the best modes for carrying out the disclosure have been described in detail, those familiar with the art to which this disclosure relates will recognize various alternative designs and embodiments for practicing the disclosure within the scope of the appended claims.

The invention claimed is:

1. A method comprising:

possessing an amplifier stand having a first amplifier support member, a second amplifier support member, a first base member, and a second base member, a first telescoping tube assembly interconnecting the first and second base members, a second telescoping tube assembly interconnecting the first base member and the first amplifier support member, and a third telescoping tube assembly interconnecting the second base member and the second amplifier support member;

wherein the first base member and the first amplifier support member are selectively rotatable with respect to the second telescoping tube assembly;

wherein the second base member and the second amplifier support member are selectively rotatable with respect to the third telescoping tube assembly;

wherein the amplifier stand is reconfigurable between a use configuration in which each of the first base member and the first amplifier support member are perpendicular to the second telescoping tube assembly and the second base member and the second amplifier support member are perpendicular to the third telescoping tube assembly, and a collapsed configuration in which each of the first base member, the second base member, the first amplifier support member, and the second amplifier support member is parallel to the second and third telescoping tube assemblies;

causing the amplifier stand to be in the use position;

placing the first and second base members on the ground;

placing a first amplifier on the first and second base members; and placing a second amplifier on the first and second amplifier support members such that the second amplifier is directly above the first amplifier;

wherein each of the first base member, the second base member, the first amplifier support member, and the second amplifier support member includes only one respective load bearing component;

wherein the respective load bearing component of each of the first base member, the second base member, the first amplifier support member, and the second amplifier support member is a single metal tube.

2. The method of claim 1, wherein at least one of the first and second amplifiers is a combo amp.

3. The method of claim 1, wherein at least one of the first and second amplifiers is a head and cabinet.

4. The method of claim 1, wherein the vertical distance between the first base member and the first amplifier support member is selectively variable;

wherein the vertical distance between the second base member and the second amplifier support member is selectively variable; and wherein the method further comprises raising or lowering the first and second amplifier support members relative to the first and second base members.

5. The method of claim 4, wherein the horizontal distance between the first and second base members is selectively variable;

wherein the horizontal distance between the first and second amplifier support members is selectively variable;

wherein the method further comprises altering the distance between the first and second base members and altering the distance between the first and second amplifier support members.

6. The method of claim 5, wherein the first base member defines a first upwardly-facing surface, the second base member defines a second upwardly-facing surface, the first amplifier support member defines a third upwardly-facing surface, and the second amplifier support member defines a fourth upwardly-facing surface;

wherein the first amplifier is in contact with, and supported by, the first and second upwardly-facing surfaces;

wherein the second amplifier is in contact with, and supported by, the third and fourth upwardly-facing surfaces;

wherein the first and second upwardly facing surfaces are coplanar in a first plane that is within twenty degrees of horizontal; and wherein the third and fourth upwardly-facing surfaces are coplanar in a second plane that is within twenty degrees of horizontal.

7. The method of claim 6, wherein the first and second planes are within ten degrees of horizontal.

8. The method of claim 1, wherein a fourth telescoping tube assembly that interconnects the second and third telescoping tube assemblies.

9. An amplifier stand comprising:

a first amplifier support member, a second amplifier support member, a first base member, and a second base member, a first telescoping tube assembly interconnecting the first and second base members, a second telescoping tube assembly interconnecting the first base member and the first amplifier support member, and a third telescoping tube assembly interconnecting the second base member and the second amplifier support member;

wherein the first base member and the first amplifier support member are selectively rotatable with respect to the second telescoping tube assembly;

wherein the second base member and the second amplifier support member are selectively rotatable with respect to the third telescoping tube assembly;

wherein the amplifier stand is reconfigurable between a use configuration in which each of the first base member and the first amplifier support member are perpendicular to the second telescoping tube assembly and the second base member and the second amplifier support member are perpendicular to the third telescoping tube assembly, and a collapsed configuration in which each of the first base member, the second base member, the first amplifier support member, and the second amplifier support member is parallel to the second and third telescoping tube assemblies;

wherein the amplifier stand is in the use configuration;

wherein a first amplifier is supported by the first and second base members;

wherein a second amplifier is supported by the first and second amplifier support members;

wherein each of the first base member, the second base member, the first amplifier support member, and the second amplifier support member includes only one respective load bearing component;

wherein the respective load bearing component of each of the first base member, the second base member, the first amplifier support member, and the second amplifier support member is a single metal tube.

* * * * *